US012773891B2

(12) United States Patent
Dong et al.

(10) Patent No.: US 12,773,891 B2
(45) Date of Patent: Oct. 27, 2026

(54) THERMAL MANAGEMENT SYSTEM WITH IMPROVED WORKING EFFICIENCY OF COMPRESSOR

(71) Applicant: SANHUA HOLDING GROUP CO., LTD., Zhejiang (CN)

(72) Inventors: Junqi Dong, Hangzhou City (CN); Yibiao Wang, Hangzhou City (CN); Shiwei Jia, Hangzhou City (CN); Linjie Huang, Hangzhou City (CN)

(73) Assignee: HANGZHOU SANHUA RESEARCH INSTITUTE CO., LTD., Hangzhou City (CN)

( * ) Notice: Subject to any disclaimer, the term of this patent is extended or adjusted under 35 U.S.C. 154(b) by 565 days.

(21) Appl. No.: 18/029,658

(22) PCT Filed: Sep. 17, 2021

(86) PCT No.: PCT/CN2021/118916
§ 371 (c)(1),
(2) Date: Mar. 30, 2023

(87) PCT Pub. No.: WO2022/068606
PCT Pub. Date: Apr. 7, 2022

(65) Prior Publication Data

US 2023/0356564 A1 Nov. 9, 2023

(30) Foreign Application Priority Data

Sep. 30, 2020 (CN) ......................... 202011069952.0
Sep. 30, 2020 (CN) ......................... 202011069997.8

(51) Int. Cl.
*B60H 1/00* (2006.01)
*B60H 1/32* (2006.01)
(Continued)

(52) U.S. Cl.
CPC ..... *B60H 1/00907* (2013.01); *B60H 1/00271* (2013.01); *B60H 1/00278* (2013.01);
(Continued)

(58) Field of Classification Search
CPC ............ B60H 1/00907; B60H 1/00271; B60H 1/00278; B60H 1/3223;
(Continued)

(56) References Cited

U.S. PATENT DOCUMENTS 4,616,484 A * 10/1986 Mehdi ..................... F25B 41/20
62/243
5,598,887 A * 2/1997 Ikeda .................. B60H 1/3207
165/240
(Continued)

FOREIGN PATENT DOCUMENTS

CN 103256746 A 8/2013
CN 104094068 A 10/2014
(Continued)

*Primary Examiner* — Ljiljana V. Ciric
(74) *Attorney, Agent, or Firm* — Cheng-Ju Chiang

(57) ABSTRACT

A thermal management system includes a compressor, a first heat exchanger, a first flow regulating device, a second heat exchanger, a third heat exchanger and a first pump. The compressor includes a first flow channel to circulate a refrigerant and a second flow channel to circulate a coolant. The first flow channel of the compressor is not in communication with the second flow channel of the compressor. The second flow channel of the compressor is capable of communicating with the third heat exchanger. The first flow channel of the compressor is capable of communicating with the first heat exchanger. The thermal management system has a coolant mode and a first cooling mode. The thermal management system is capable of performing the coolant mode and the first cooling mode simultaneously.

6 Claims, 6 Drawing Sheets

(51) Int. Cl.

| | |
|---|---|
| ***F25B 9/00*** | (2006.01) |
| ***F25B 13/00*** | (2006.01) |
| ***F25B 40/00*** | (2006.01) |
| ***F25B 41/24*** | (2021.01) |

(52) U.S. Cl.

CPC .............. *F25B 13/00* (2013.01); *F25B 41/24* (2021.01); *B60H 2001/00307* (2013.01); *B60H 2001/00928* (2013.01); *B60H 2001/00935* (2013.01); *B60H 2001/00949* (2013.01); *B60H 2001/00957* (2013.01); *B60H 1/3223* (2013.01); *F25B 9/008* (2013.01); *F25B 40/00* (2013.01); *F25B 2313/003* (2013.01); *F25B 2313/004* (2013.01); *F25B 2313/0233* (2013.01); *F25B 2313/0234* (2013.01); *F25B 2313/0254* (2013.01); *F25B 2400/121* (2013.01)

(58) Field of Classification Search

CPC ........... B60H 2001/00307; B60H 2001/00928; B60H 2001/00935; B60H 2001/00949; B60H 2001/00957; F25B 13/00; F25B 41/24; F25B 9/008; F25B 40/00; F25B 2313/003; F25B 2313/004; F25B 2313/0233; F25B 2313/0234; F25B 2313/0254; F25B 2400/121

See application file for complete search history.

(56) References Cited

U.S. PATENT DOCUMENTS

| | | | | |
|---|---|---|---|---|
| 6,073,459 | A * | 6/2000 | Iritani | F25B 41/39 62/211 |
| 8,336,319 | B2 * | 12/2012 | Johnston | B60K 11/04 62/434 |
| 9,360,011 | B2 * | 6/2016 | Perevozchikov | F25B 49/02 |
| 9,459,028 | B2 * | 10/2016 | Styles | F25B 29/003 |
| 9,719,691 | B2 * | 8/2017 | Takenaka | F25B 13/00 |
| 9,863,671 | B2 * | 1/2018 | Ragazzi | F25B 49/02 |
| 10,018,401 | B2 * | 7/2018 | Hamamoto | B60H 1/00785 |
| 10,040,334 | B2 * | 8/2018 | Graaf | B60H 1/00899 |
| 10,119,738 | B2 * | 11/2018 | Hammond | F25B 13/00 |
| 10,124,647 | B2 * | 11/2018 | Bidner | B60H 1/00271 |
| 10,207,564 | B2 * | 2/2019 | Hamamoto | B60H 1/00328 |
| 10,226,980 | B2 * | 3/2019 | Shan | B60H 1/00278 |
| 10,486,494 | B2 * | 11/2019 | Koberstein | B60H 1/00899 |
| 10,723,203 | B2 * | 7/2020 | Kato | F25B 5/04 |
| 10,967,702 | B2 * | 4/2021 | Mancini | B60H 1/00564 |
| 11,137,172 | B2 * | 10/2021 | Kniffler | F25B 25/005 |
| 11,267,318 | B2 * | 3/2022 | He | B60H 1/00907 |
| 11,446,979 | B2 * | 9/2022 | He | B60H 1/00899 |
| 11,479,082 | B2 * | 10/2022 | Chatham | B60H 1/00328 |
| 11,747,057 | B2 * | 9/2023 | Dong | F25B 40/06 62/238.7 |
| 11,920,834 | B2 * | 3/2024 | Shey | F25B 25/005 |
| 11,927,377 | B2 * | 3/2024 | Hammond | F25B 13/00 |
| 12,038,207 | B2 * | 7/2024 | Tada | B60H 1/32 |
| 12,065,016 | B2 * | 8/2024 | Dong | F25B 41/30 |
| 12,103,353 | B2 * | 10/2024 | Dong | B60H 1/00392 |
| 12,122,213 | B2 * | 10/2024 | He | B60H 1/00278 |
| 2005/0138942 | A1 * | 6/2005 | Grimm | B60H 1/032 62/235.1 |
| 2005/0166619 | A1 * | 8/2005 | Taras | F24F 11/67 62/196.4 |
| 2013/0074525 | A1 * | 3/2013 | Johnston | B60H 1/323 62/126 |
| 2014/0298837 | A1 * | 10/2014 | Tanda | F25B 41/24 62/150 |
| 2018/0086224 | A1 * | 3/2018 | King | H01M 10/663 |
| 2019/0061470 | A1 * | 2/2019 | Koberstein | B60H 1/00392 |
| 2019/0070924 | A1 | 3/2019 | Mancini et al. | |
| 2020/0290429 | A1 * | 9/2020 | Blatchley | B60H 1/321 |
| 2022/0410657 | A1 * | 12/2022 | Kim | B60H 1/32284 |
| 2023/0356564 | A1 * | 11/2023 | Dong | B60H 1/00907 |
| 2023/0391160 | A1 * | 12/2023 | Wang | B60H 1/034 |
| 2024/0019177 | A1 * | 1/2024 | Iwata | B60H 1/3229 |
| 2024/0210085 | A1 * | 6/2024 | Hammond | F25B 49/02 |

FOREIGN PATENT DOCUMENTS

| | | | | | |
|---|---|---|---|---|---|
| CN | 205403255 | U | | 7/2016 | |
| CN | 106568241 | A | | 4/2017 | |
| CN | 106662366 | A | | 5/2017 | |
| CN | 107639992 | A | | 1/2018 | |
| CN | 107639993 | A | | 1/2018 | |
| CN | 107848368 | A | | 3/2018 | |
| CN | 108571834 | A | | 9/2018 | |
| CN | 109140815 | A | | 1/2019 | |
| CN | 109140816 | A | | 1/2019 | |
| CN | 109269152 | A | | 1/2019 | |
| CN | 109405365 | A | | 3/2019 | |
| CN | 109900023 | A | | 6/2019 | |
| CN | 111231612 | A | | 6/2020 | |
| CN | 111319514 | A | | 6/2020 | |
| CN | 210680462 | U | | 6/2020 | |
| CN | 210951942 | U | | 7/2020 | |
| CN | 112428769 | A | | 3/2021 | |
| CN | 112428771 | A | | 3/2021 | |
| DE | 19846949 | A1 | | 4/1999 | |
| DE | 102012218509 | A1 | | 4/2013 | |
| EP | 2574482 | A1 | * | 4/2013 | B60H 1/00385 |
| EP | 2610559 | A2 | | 7/2013 | |
| EP | 3133357 | B1 | * | 9/2018 | F25B 5/04 |
| EP | 3173268 | B1 | * | 6/2020 | F25B 49/02 |
| EP | 3982059 | B1 | * | 5/2024 | F25B 13/00 |
| FR | 2487487 | A1 | | 1/1982 | |
| GB | 2575546 | A | | 1/2020 | |
| GB | 2575546 | B | * | 12/2020 | B60L 58/26 |
| JP | 2005-264869 | A | | 9/2005 | |
| JP | 2015-37894 | A | | 2/2015 | |
| JP | 2016-156557 | A | | 9/2016 | |
| JP | 6420686 | B2 | * | 11/2018 | |
| JP | 2020003151 | A | * | 1/2020 | F25B 49/02 |
| KR | 20210087327 | A | * | 7/2021 | B60H 1/32284 |
| RU | 2701276 | C2 | * | 9/2019 | B60H 1/00 |
| WO | 2012/055956 | A1 | | 5/2012 | |
| WO | WO-2021112522 | A1 | * | 6/2021 | B60H 1/00278 |

* cited by examiner

THERMAL MANAGEMENT SYSTEM WITH IMPROVED WORKING EFFICIENCY OF COMPRESSOR

CROSS-REFERENCE TO RELATED APPLICATIONS

This patent application is a 35 U.S.C. § 371 National Phase conversion of International (PCT) Patent Application No. PCT/CN2021/118916, filed on Sep. 17, 2021, which claims priority of Chinese Patent Application Nos. 202011069952.0 and 202011069997.8, filed on Sep. 30, 2020 and titled "THERMAL MANAGEMENT SYSTEM", the relevant content of which is incorporated herein by reference. The PCT International Patent Application was filed and published in Chinese.

TECHNICAL FIELD

The present disclosure relates to a technical field of thermal management, in particular to a thermal management system.

BACKGROUND

A compressor includes a motor assembly and a compression assembly. The compression assembly is used to compress a low-temperature and low-pressure gaseous refrigerant into a high-temperature and high-pressure gaseous refrigerant. The motor assembly powers the compression assembly to compress the refrigerant. The motor assembly continues to heat up during operation and needs to be cooled down. In the related art, the refrigerant flowing into the compressor firstly flows through the motor assembly so as to cool down the temperature of the motor assembly. After absorbing heat, the refrigerant enters an inlet of the compression assembly, is compressed in the compression assembly, and then flows out of the compressor from an outlet of the compression assembly. The refrigerant before entering the compression assembly has absorbed the heat of the motor assembly, and the temperature of the refrigerant at the inlet of the compression assembly is relatively high. Under the same volume, the concentration of the refrigerant becomes smaller, and the amount of refrigerant compressed by the compression assembly becomes smaller each time, so that the working efficiency of the compressor becomes lower. The inventors believe that there is a need for improvement.

SUMMARY

In view of the above-mentioned problems in the related art, the present disclosure provides a thermal management system capable of improving a working efficiency of a compressor.

In order to achieve the above object, the present disclosure adopts the following technical solution: a thermal management system, including: a compressor, a first heat exchanger, a first flow regulator, a second heat exchanger, a third heat exchanger and a first pump; the compressor including a first flow channel to circulate a refrigerant and a second flow channel to circulate a coolant; the first flow channel of the compressor is not in communication with the second flow channel of the compressor;

the second flow channel of the compressor being capable of communicating with the third heat exchanger; the first flow channel of the compressor being capable of communicating with the first heat exchanger; the first heat exchanger being capable of communicating with the first flow regulator; the first flow regulator being capable of communicating with the second heat exchanger; the second heat exchanger being capable of communicating with the first flow channel of the compressor;

wherein the thermal management system has a coolant mode and a first cooling mode; in the coolant mode, the first pump, the second flow channel of the compressor and the third heat exchanger are in communication to form a coolant circuit; and the third heat exchanger performs heat exchange with an atmospheric environment;

in the first cooling mode, the first flow channel of the compressor, the first heat exchanger, the first flow regulator and the second heat exchanger are in communication to form a refrigerant circuit; an outlet of the first flow regulator is in communication with an inlet of the second heat exchanger; and the first flow regulator is in a throttling state; and wherein the thermal management system is capable of performing the coolant mode and the first cooling mode simultaneously.

The thermal management system of the present disclosure can simultaneously perform the first cooling mode and the coolant mode, and can realize the thermal management of a compartment and the compressor at the same time. Wherein, in the coolant mode, the coolant flows through the second channel of the compressor, and then the residual heat of the compressor is brought to the third heat exchanger through the circulating flow of the coolant. The heat is released to the atmospheric environment at the third heat exchanger, so as to lower the temperature of the coolant. The temperature of the compressor is lowered by circulating the coolant, so that the temperature of the refrigerant at the inlet of the compression assembly of the compressor becomes lower. The compressed refrigerant has a higher concentration, which can improve the compression efficiency of the compressor, thereby improving the working efficiency of the compressor.

DETAILED DESCRIPTION

Figure 1:
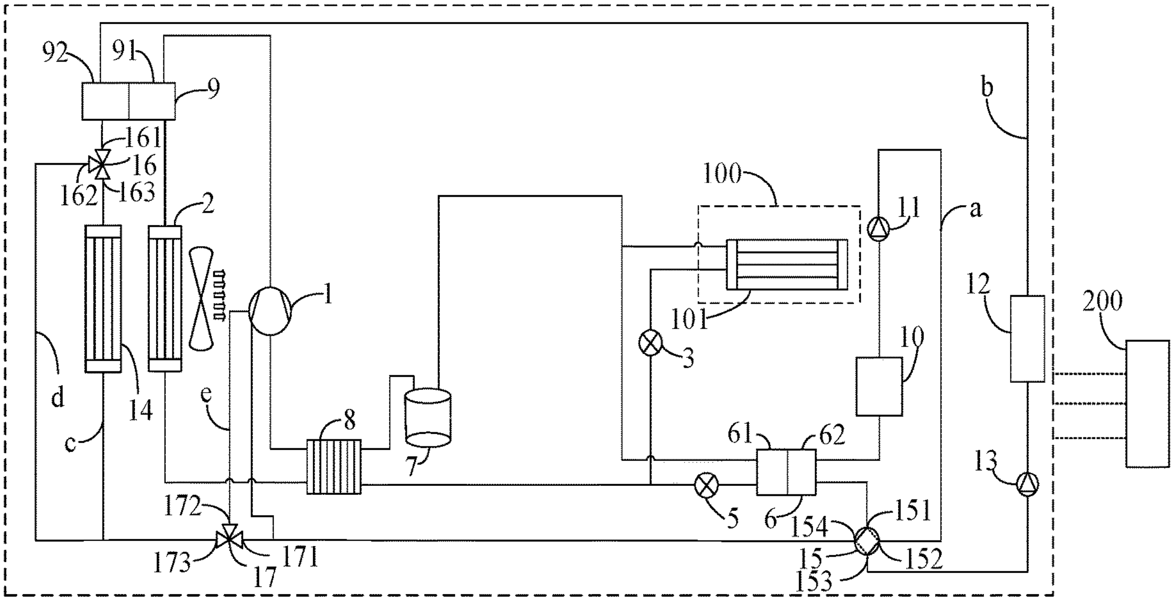
FIG. 1 is a schematic connection diagram of a thermal management system in a first embodiment of the present disclosure.
Figure 2:
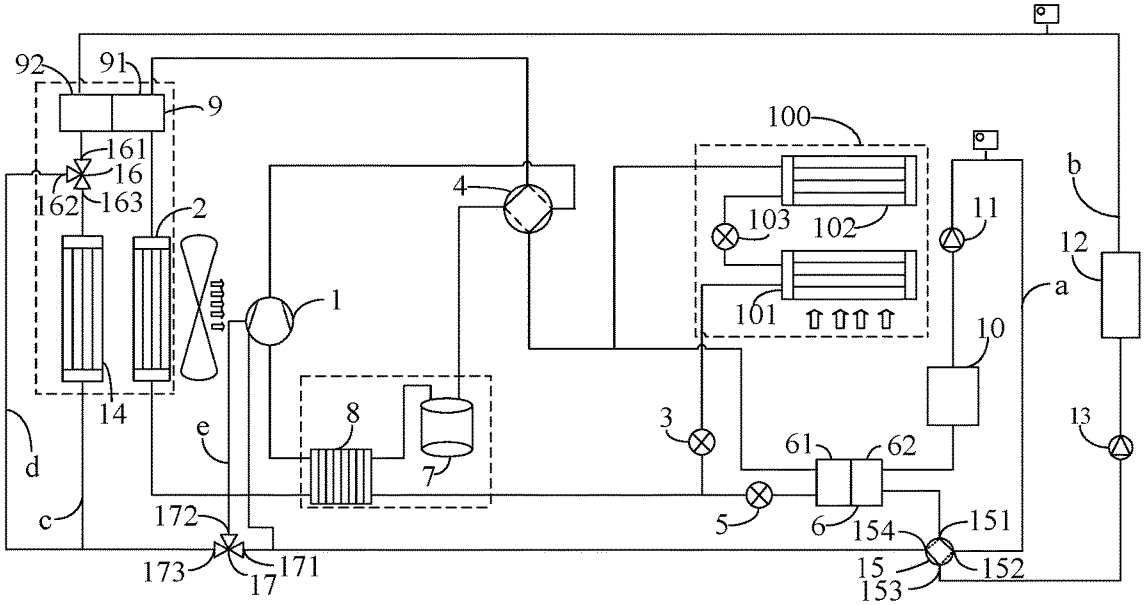
FIG. 2 is a schematic connection diagram of the thermal management system in a second embodiment of the present disclosure.
Figure 3:
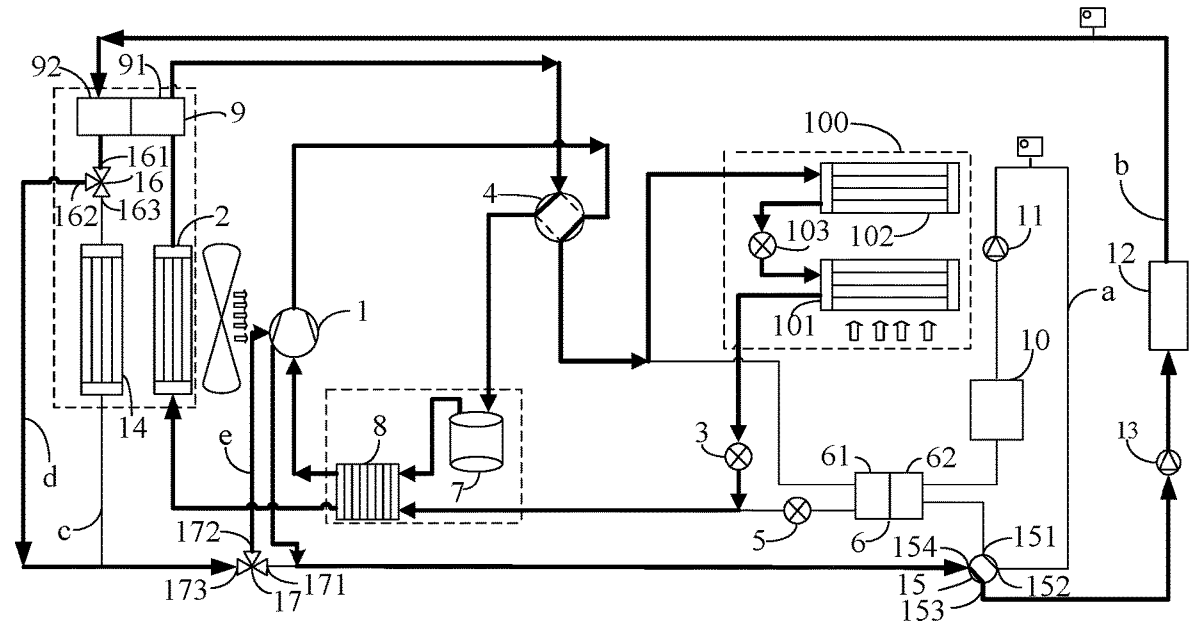
FIG. 3 is a schematic diagram of a working principle of a first heating mode of the thermal management system in the second embodiment of the present disclosure.
Figure 4:
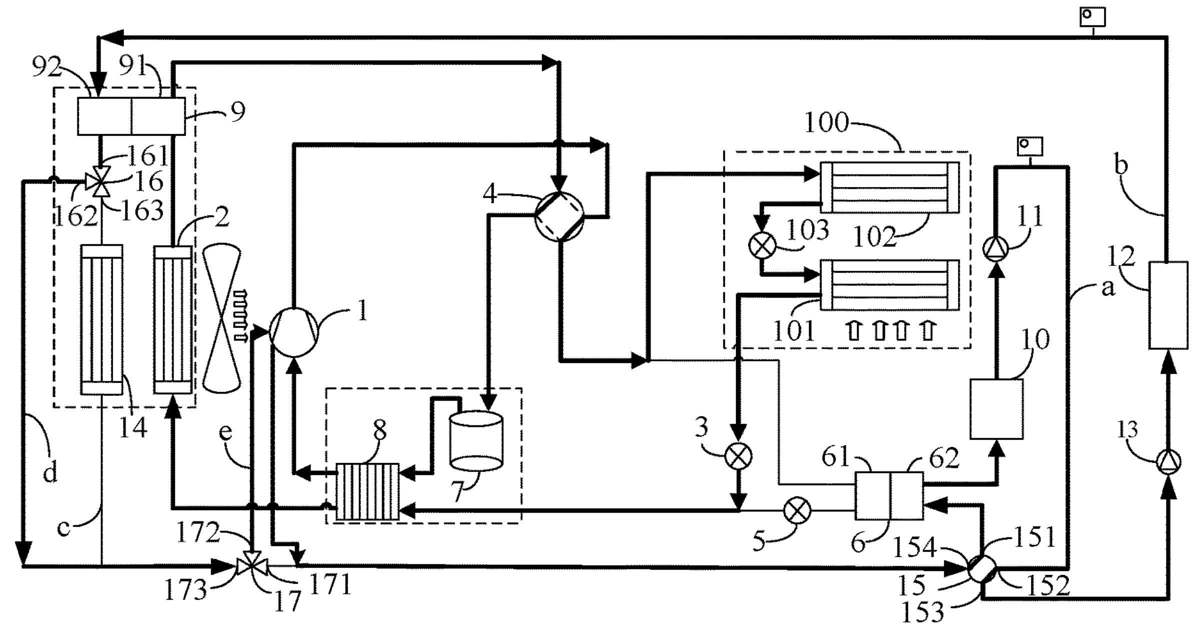
FIG. 4 is a schematic diagram of a working principle of a second heating mode of the thermal management system in the second embodiment of the present disclosure.

The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise. It should be understood that "first", "second" and similar words used in the specification and claims of the present disclosure do not indicate any order, quantity or importance, but are only used to distinguish different components. Similarly, words such as "a" or "an" do not mean a quantity limit, but mean that there is at least one. "A plurality of" means a quantity of two or more. Unless otherwise indicated, similar words such as "front", "rear", "lower" and/or "upper" are only for convenience of description, and are not limited to one position or one spatial orientation. Terms such as "including" or "comprising" and other similar words mean that the elements or components before "including" or "comprising" now cover the elements or components listed after "including" or "comprising" and their equivalents, and do not exclude other elements or components.

Thermal management systems of the exemplary embodiments of the present disclosure will be described in detail below with reference to the accompanying drawings. All thermal management systems provided in the embodiments of the present disclosure can be used in electric vehicles. In the case of no conflict, the features in the following embodiments and implementations can complement each other or be combined with each other.

The thermal management systems of the present disclosure can be applied to equipment such as vehicles and ships that have relatively confined spaces and require thermal management. Optionally, the thermal management systems of the present disclosure can be applied to electric vehicles. For ease of description, the following embodiments are described by taking the disclosure to a vehicle as an example.

According to a specific embodiment of the thermal management system of the present disclosure, as shown in FIG. 1, in a first embodiment of the thermal management system of the present disclosure, the thermal management system includes a compressor 1, a first heat exchanger 2, and a second heat exchanger 101, a third heat exchanger 14, a fourth heat exchanger 9, a fifth heat exchanger 6, a first flow regulator 3, a second flow regulating device 5, and a first pump 13. The compressor 1 of the present disclosure includes a first flow channel (not shown in the drawings) through which a refrigerant can flow, and a second flow channel (not shown in the drawings) through which a coolant can flow. The first flow channel is not in communication with the second flow channel. When the thermal management system is in operation, the compressor 1 generates heat, and the coolant in the second channel of the compressor 1 can be used to cool down the compressor 1.

In some embodiments, the compressor 1 includes a compression assembly and a drive assembly. The compression assembly is used to compress the refrigerant into a high-temperature and high-pressure gaseous refrigerant. The drive assembly powers the compression assembly to compress the refrigerant. The second flow channel of the compressor 1 can be used to cool the drive assembly. Optionally, the drive assembly includes a motor and an electric control device. Using the coolant to cool down the drive assembly can improve a problem in the related art that using a refrigerant to cool down the drive assembly causes the temperature of the refrigerant at an inlet of the compression assembly to rise, resulting in a high discharge temperature of the compressor 1.

In some embodiments, the drive assembly of the compressor 1 has a coolant flow channel (the second flow channel), which is used for cooling the drive assembly when the coolant circulates in the flow channel. In the compressor 1, a flow direction of the coolant in the second flow channel is opposite to a flow direction of the refrigerant in the first flow channel, which can lower the temperature of the refrigerant at an inlet of the compression assembly and make the density of the refrigerant entering the inlet of the compression assembly relatively high. Each action of the compression assembly compresses more refrigerant, so that the working efficiency of the compressor can be improved.

The thermal management system has a first cooling mode and a second cooling mode. The first cooling mode enables cooling of a compartment. The second cooling mode enables cooling of the compressor 1. At the same time, the thermal management system is able to perform the first cooling mode and the second cooling mode simultaneously.

Referring to FIG. 1, under the first cooling mode, the first flow channel of the compressor 1, the first heat exchanger 2, the first flow regulator 3, the second heat exchanger 101, and the first flow channel of the compressor 1 are sequentially communicated to form a refrigerant circuit. Under the second cooling mode, the first flow channel of the compressor 1, the first heat exchanger 2, the second flow regulating device 5, the fifth heat exchanger 6, and the first flow channel of the compressor 1 are sequentially communicated to form a refrigerant circuit. The first pump 13, the second channel of the compressor 1 and the second heat exchanger 6 are in communication to form a coolant circuit. It should be noted that, in the embodiment of the present disclosure, sequential communication only illustrates a sequence relationship of connections among various components. However, other components, such as shut-off valves, may also be included between various components. In addition, the type of coolant in this application can be selected according to needs, for example, the coolant can be water, oil and other substances capable of exchanging heat, or a mixed liquid of water and ethylene glycol, or other mixed liquids capable of exchanging heat. The type of refrigerant in this application can be selected according to needs, for example, the refrigerant can be one of R134a, R744 and R134yf.

Specifically, under the first cooling mode, the first heat exchanger 2 is used as a condenser, and the second heat exchanger 101 is used as an evaporator. Referring to FIG. 1, the compressor 1 compresses the low-temperature and low-pressure gaseous refrigerant into the high-temperature and high-pressure gaseous refrigerant. The high-temperature and high-pressure refrigerant exchanges heat with an atmospheric environment in the first heat exchanger 2, and the refrigerant releases heat. The released heat is brought to the atmospheric environment by the air flow, and the refrigerant undergoes a phase change and condenses into a liquid or gas-liquid two-phase refrigerant. The refrigerant flows out of the first heat exchanger 2 and is throttled by the second flow regulating device 3 so as to lower the temperature and pressure to become a low-temperature and low-pressure refrigerant. The low-temperature and low-pressure refrigerant enters the second heat exchanger 101 and absorbs the heat of the surrounding air in the second heat exchanger 101 to lower the temperature of the air around the second heat exchanger 101. Under the action of the air flow, cold air enters a grille air duct (not shown in the drawings) and is sent into the compartment to lower the temperature of the compartment and realize the function of cooling the compartment. The refrigerant undergoes a phase change and most of it evaporates into a low-temperature and low-pressure gaseous refrigerant, which flows back into the first channel of the compressor 1 and circulates in this way.

In the second cooling mode, the first heat exchanger 2 is used as a condenser, and the fifth heat exchanger 6 is used as an evaporator. Referring to FIG. 1, the compressor 1 compresses a low-temperature and low-pressure gaseous refrigerant into a high-temperature and high-pressure gaseous refrigerant. The high-temperature and high-pressure refrigerant exchanges heat with the outdoor air flow in the first heat exchanger 2, and the refrigerant releases heat. The released heat is brought to the external environment by the air flow, and the refrigerant undergoes a phase change and condenses into a liquid or gas-liquid two-phase refrigerant. The refrigerant flows out of the first heat exchanger 2, enters the second flow regulating device 5 to be throttled, and reduces the temperature and pressure to become a low-temperature and low-pressure refrigerant. The low-temperature and low-pressure refrigerant enters the fifth heat exchanger 6, and the refrigerant exchanges heat with the coolant in the fifth heat exchanger 6. The refrigerant absorbs the heat of the coolant, and the low-temperature coolant enters the second channel of the compressor 1. The low-temperature coolant absorbs the heat of the compressor 1 to lower the temperature of the compressor 1, thereby realizing the function of cooling the compressor 1. The coolant that absorbs the heat of the compressor 1 flows into the fifth heat exchanger 6 and exchanges heat with the refrigerant, and circulates in this way. The refrigerant undergoes a phase change and most of it evaporates into a low-temperature and low-pressure gaseous refrigerant, which flows back into the first channel of the compressor 1 and circulates in this way. It should be understood that the refrigerant and the coolant only exchange heat in the fifth heat exchanger 6 and do not mix. In the fifth heat exchanger 6, there is no communication between the flow channel through which the refrigerant flows and the flow channel through which the coolant flows.

In this embodiment, the fifth heat exchanger 6 can be a plate heat exchanger or other water-cooled heat exchangers; and the first heat exchanger 2 and the second heat exchanger 101 can be air-cooled heat exchangers according to needs, which is not limited in this application.

In the embodiment of the present disclosure, when the second cooling mode is in operation, the coolant is cooled by the refrigerant, and then the compressor 1 is cooled by the coolant. On the one hand, some problems in the related art when the compressor 1 is cooled by the refrigerant can be improved. On the other hand, the compressor 1 is cooled by the coolant, and the temperature of the compressor 1 can be controlled more accurately by adjusting the flow rate of the coolant flowing through the second channel of the compressor 1 or adjusting the opening degree of the second flow regulating device 5.

In addition, a gas-liquid separator 7 may be provided at an inlet of the first flow channel of the compressor 1, so as to separate the refrigerant from gas and liquid before entering the compressor 1, and store the liquid refrigerant in the gas-liquid separator 7. The low-temperature and low-pressure gaseous refrigerant enters the compressor 1 to be recompressed, so as to realize the recycling of the refrigerant and reduce the possibility of liquid shock in the compressor 1. Of course, for some new compressors 1, the gas-liquid separator 7 may not be provided.

In addition, the thermal management system includes an intermediate heat exchanger 8. The intermediate heat exchanger 8 includes a high-pressure side and a low-pressure side. The high pressure side is connected between a heat exchanger serving as a condenser and a throttling device. The low-pressure side is connected between a heat exchanger serving as an evaporator and the inlet of the first flow channel of the compressor. In the intermediate heat exchanger 8, the higher-temperature refrigerant flowing out from the condenser and the lower-temperature refrigerant flowing out from the evaporator can exchange heat. The temperature of the refrigerant flowing through the high-pressure side is lowered again, so that the temperature of the refrigerant throttled by the throttling device is lower. As a result, the cooling effect of the evaporator is better. The temperature of the refrigerant flowing through the low-pressure side rises, making a suction port of the compressor superheated, which further ensures that the refrigerant entering the compressor 1 is in a gaseous state, and reduces liquid shock. Using the intermediate heat exchanger 8 can improve the cooling effect of the thermal management system.

Hereinafter, the structure of the thermal management system will be further described with the assumption that the inlet of the first flow channel of the compressor 1 is not provided with the gas-liquid separator 7.

The first flow regulator 3 and the second flow regulating device 5 can play a role of throttling, reducing pressure and cutting off in the thermal management system, and can include throttle valves, ordinary thermal expansion valves or electronic expansion valves, etc. Referring to FIG. 1, in this embodiment, the first flow regulator 3 is connected in series between the first heat exchanger 2 and the second heat exchanger 101. The second flow regulating device 5 is connected in series between the first heat exchanger 2 and the fifth heat exchanger 6. Wherein, the first flow regulator 3 is arranged adjacent to the second heat exchanger 101, and the second flow regulating device 5 is arranged adjacent to the fifth heat exchanger 6.

The thermal management system includes a coolant mode. Under the coolant mode, the first pump 13, the third heat exchanger 14, the second channel of the compressor 1, and the first pump 13 are sequentially communicated to form a coolant circuit. Optionally, the third heat exchanger 14 is a low-temperature water tank, and the third heat exchanger 14 can exchange heat with the outdoor environment. In the coolant mode, the heat of the compressor 1 is brought to the third heat exchanger 14 and released into the air through the circulating flow of the coolant, so as to realize the cooling of the compressor 1. The thermal management system is capable of performing the first cooling mode and the coolant mode simultaneously. Cooling of the compartment is achieved through the refrigerant circuit, and cooling of the compressor 1 is achieved through the coolant circuit. The circulating flow of the coolant circuit can make the compressor 1 work at a more suitable temperature. At the suitable temperature, the working efficiency of the compressor 1 is higher, so that the cooling effect of the compartment is better.

Since the cooling capacity at the fifth heat exchanger 6 is higher than the cooling capacity of the third heat exchanger 14, when the second cooling mode and the coolant mode are performed at the same time, the third heat exchanger 14 may absorb heat from the air, which is not beneficial to the cooling effect of the compressor 1. When the second cooling mode is performed, the third heat exchanger 14 needs to be bypassed to fully utilize the cooling capacity of the fifth heat exchanger 6 and save energy.

The thermal management system may also include a device to be cooled, a second pump 11 and a first valve 15. In this embodiment, the device to be cooled includes a motor heat exchange assembly 12 and a battery heat exchange assembly 10. The battery heat exchange assembly 10 can exchange heat with a battery pack. The battery pack supplies power to electrical equipment of a vehicle. The motor heat exchange assembly 12 can exchange heat with a motor assembly. The motor assembly provides power to power equipment such as wheels of the vehicle.

In this embodiment, referring to FIG. 1, the third heat exchanger 14, the first pump 13, the second pump 11, the first valve 15, the motor heat exchange assembly 12, the battery heat exchange assembly 10 and the second flow of the compressor 1 constitute a coolant system. The coolant system includes a first flow path a, a second flow path b, a third flow path c, a fourth flow path d and a fifth flow path e. Wherein, the battery heat exchange assembly 10, the second heat exchanger 6 and the second pump 11 are arranged in the first flow path a; the motor heat exchange assembly 12 and the first pump 13 are arranged in the second flow path b; the third heat exchanger 14 is arranged in the third flow path c; the second flow channel of the compressor 1 is connected to the fifth flow path e; the fourth flow path d is a bypass pipeline; and the third flow path c is connected in parallel with the fourth flow path d. The first valve 15 has a first port 151, a second port 152, a third port 153 and a fourth port 154. Referring to FIGS. 3 to 7, the first valve 15 has a first working state and a second working state. In the first working state, the first port 151 is in communication with the second port 152, and the third port 153 is in communication with the fourth port 154. In the second working state, the first port 151 is in communication with the fourth port 154, and the second port 152 is in communication with the third port 153.

Referring to FIG. 1, one end of the first flow path a is in communication with the first port 151, and the other end of the first flow path a is in communication with the second port 152. One end of the second flow path b is in communication with the third port 153, and the other end of the second flow path b may communicate with one end of the third flow path c and/or one end of the fourth flow path d. The other end of the third flow path c and the other end of the fourth flow path d may communicate with one end of the fifth flow path e or communicate with the fourth port 154. The other end of the fifth flow path e is in communication with the fourth port 154.

Figure 6:
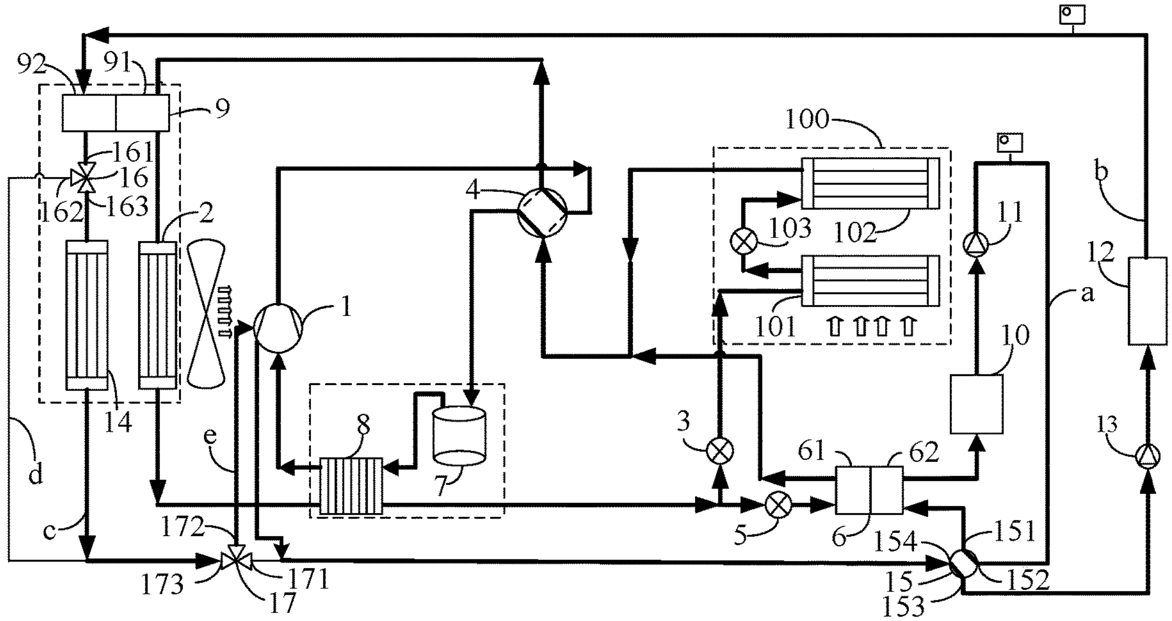
FIG. 6 is a schematic diagram of a working principle of a first cooling mode of the thermal management system in the second embodiment of the present disclosure.
Figure 7:
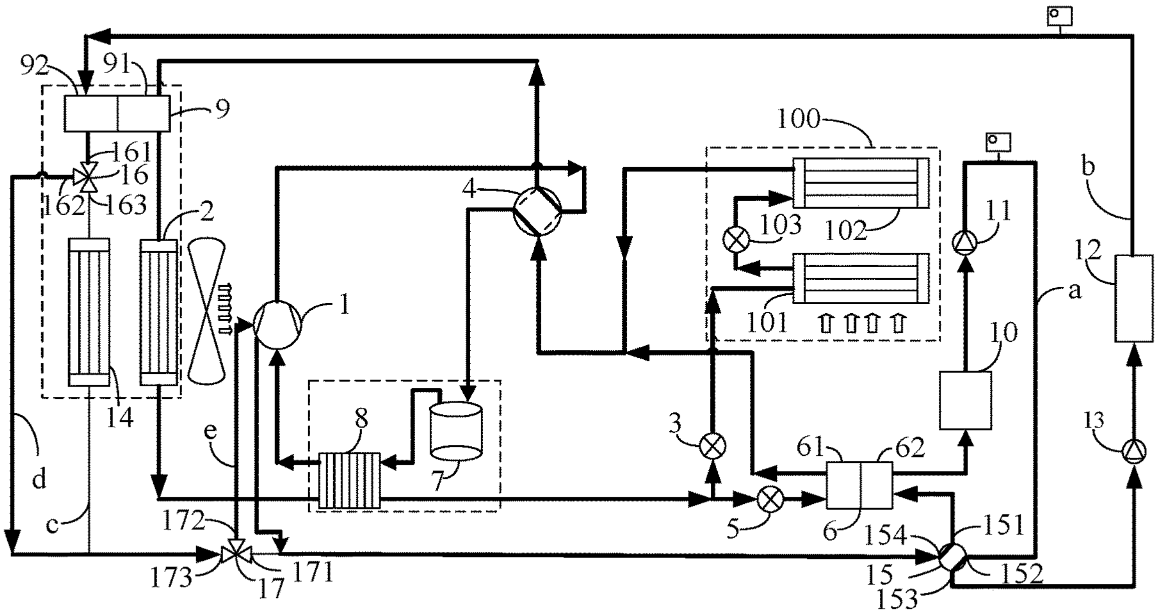
FIG. 7 is a schematic diagram of a working principle of a second cooling mode of the thermal management system in the second embodiment of the present disclosure.

Referring to FIG. 6, when the first valve 15 is in the first working state, the first flow path a can form a circuit by itself. The battery pack can be cooled by the fifth heat exchanger 6. The second flow path b, the third flow path c, and the fifth flow path e may be communicated in series through the first valve 15 to form a circuit. The heat of the motor assembly and the compressor 1 can be released to the outside through the third heat exchanger 14. When the compressor 1 has no cooling demand, the second flow path b and the third flow path c may be communicated in series through the first valve 15 to form a circuit. The heat of the motor assembly can be released to the outside through the third heat exchanger 14. When the compressor 1 and the motor assembly have no cooling demand or the cooling demand is not high, the second flow path b and the fourth flow path d may be communicated in series through the first valve 15 to form a circuit; or, the second flow path b, the fourth flow path d and the fifth flow path e are communicated in series through the first valve 15 to form a circuit. At this time, the first pump 13 may not be turned on.

Figure 5:
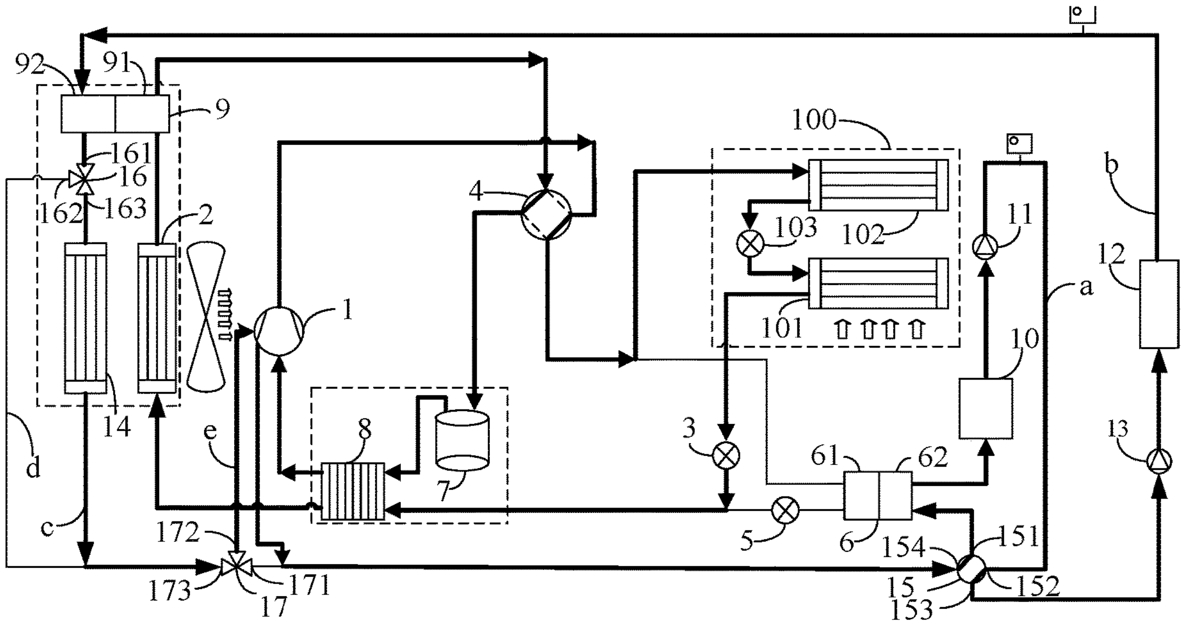
FIG. 5 is a schematic diagram of a working principle of a third heating mode of the thermal management system in the second embodiment of the present disclosure.

Referring to FIG. 5, when the first valve 15 is in the second working state, the first flow path a, the second flow path b and the third flow path c can be communicated in series through the first valve 15 to form a circuit. At this time, the second flow regulating device 5 is in a cut-off state, and the heat of the motor assembly and the battery pack can be released to the outside through the third heat exchanger 14. It is also possible that the first flow path a, the second flow path b and the fourth flow path d are communicated in series through the first valve 15 to form a circuit. At this time, the second flow regulating device 5 is in a throttling state, and the motor assembly and the battery pack can be cooled by the fifth heat exchanger 6. It is also possible that the first flow path a, the second flow path b, the third flow path c and the fifth flow path e are communicated in series through the first valve 15 to form a circuit. At this time, the second flow regulating device 5 is in the cut-off state, and the heat of the compressor 1, the motor assembly and the battery pack can be released to the outside through the third heat exchanger 14. It is also possible that the first flow path a, the second flow path b, the fourth flow path d and the fifth flow path e are communicated in series through the first valve 15 to form a circuit. At this time, the second flow regulating device 5 is in a throttling state, and the motor assembly, the battery pack and the compressor 1 are cooled by the fifth heat exchanger 6. According to the requirements of the thermal management system, the connection mode of the coolant circuit can be adjusted, and the waste heat of the compressor, the waste heat of the motor assembly, and the waste heat of the battery pack can be reasonably used. Alternatively, the compressor, the motor assembly, and the battery pack can be dissipated in different ways to make the thermal management system more energy-efficient, with better heat transfer effect and better vehicle range.

It should be understood that, in some embodiments, when the first valve 15 is in the first working state, the first flow path a forms a circuit by itself, when the battery pack does not need to be cooled, the second flow regulating device 5 can be in the cut-off state.

The thermal management system also includes a second valve 16. The second valve 16 has a fifth port 161, a sixth port 162 and a seventh port 163. The fifth port 161 is in communication with one end of the second flow path b. The sixth port 162 is in communication with one end of the third flow path c. The seventh port 163 is in communication with one end of the fourth channel d. The communication between the second flow path b and the third flow path c and/or with the fourth flow path d can be controlled by the second valve 16.

The thermal management system also includes a third valve 17. The third valve 17 has an eighth port 171, a ninth port 172 and a tenth port 173. The eighth port 171 is in communication with one end of the fifth channel e and the fourth port 154. The ninth port 172 is in communication with the other end of the fifth flow path e. The tenth port 173 is in communication with the other end of the third flow path c and the other end of the fourth flow path d. Whether the coolant flows through the fifth flow path e can be controlled by the third valve 17, thereby controlling whether the compressor 1 is cooled by the coolant. The compressor 1 can be bypassed when the compressor 1 does not require cooling.

In this embodiment, the first pump 13 and the second pump 11 are used to provide power for the flow of the coolant circuit. Optionally, the first pump 13 and the second pump 11 may be electronic water pumps. The second valve 16 and the third valve 17 can choose three-way water valves, three-way proportional valves or combinations of valve elements. When the second valve 16 and the third valve 17 are three-way proportional valves, the flow of coolant in the two branches can be adjusted. The first valve 15 may be a four-way water valve or a combination of valve elements, which is not limited in this application.

Figure 10:
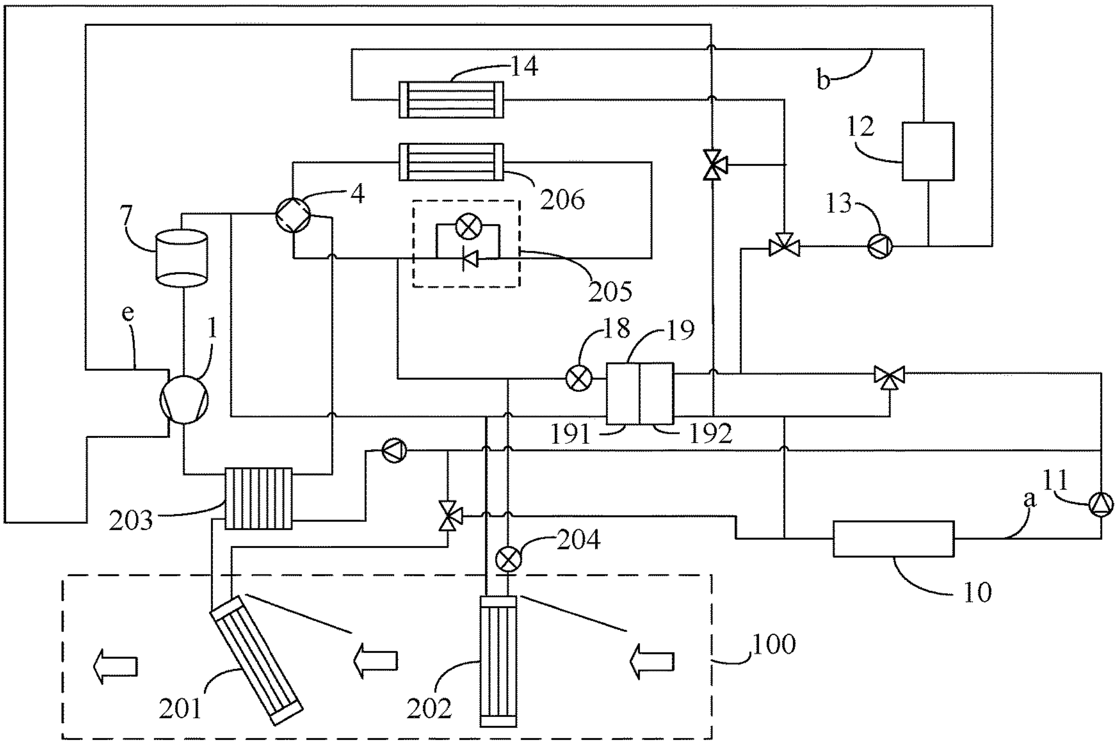
FIG. 10 is a schematic connection diagram of the thermal management system in a fifth embodiment of the present disclosure.

In some other embodiments, referring to FIG. 10, the first pump 13 may not be provided in the second flow path b. However, the first pump 13 may be in communication with the second flow path b and/or the fifth flow path e, and the second flow path b and the third flow path c are arranged in series. The fifth flow path e is arranged in parallel with a flow path in which the second flow path b and the third flow path c are communicated in series. The fifth flow path e may be communicated in series with the fifth heat exchanger 6 separately to form a circuit. The flow path after the second flow path b and the third flow path c are communicated in series may also be communicated in series with the fifth heat exchanger 6 separately to form a circuit. The first flow path a may also be communicated in series with the fifth heat exchanger 6 separately to form a circuit. It can be understood that, through the above arrangement, the fifth heat exchanger 6 can be selectively communicated with at least one of the three branches. Thereby, the thermal management of the compressor 1, the motor assembly and the battery pack can be flexibly realized without interfering with each other.

In some other embodiments, the battery heat exchange assembly 10, the second flow channel of the compressor 1, and the fifth heat exchanger 6 may be communicated in series separately to form a circuit. The cooling of the battery pack and the compressor 1 is achieved via the fifth heat exchanger 6 simultaneously.

In some other embodiments, the motor heat exchange assembly 12, the second flow channel of the compressor 1, and the fifth heat exchanger 6 may be communicated in series separately to form a circuit. The cooling of the motor assembly and the compressor 1 is achieved via the fifth heat exchanger 6 simultaneously.

In some other embodiments, the third heat exchanger 14, the second flow channel of the compressor 1 and the fifth heat exchanger 6 may also be connected in series. The cooling of the compressor 1 is achieved via the fifth heat exchanger 6 and the third heat exchanger 14 simultaneously.

The thermal management system also includes a fourth heat exchanger 9. The fourth heat exchanger 9 includes a first heat exchange portion 91 through which refrigerant can flow, and a second heat exchange portion 92 through which the coolant can flow. The first heat exchange portion 91 and the second heat exchange portion 92 can perform heat exchange. The first heat exchange portion 91 is connected between the compressor 1 and the first heat exchanger 2. The second heat exchange portion 92 is connected between the motor heat exchange assembly 12 and the third heat exchanger 14. Under the coolant mode, the first pump 13, the second heat exchange portion 92, the third heat exchanger 14, the second channel of the compressor 1, and the first pump 13 are sequentially communicated to form a coolant circuit. Under the first cooling mode, the high-temperature and high-pressure refrigerant flowing out of the first channel of the compressor 1 firstly flows through the first heat exchange portion 91. In the fourth heat exchanger 9, the coolant firstly takes away part of the heat of the refrigerant. Then, the refrigerant flows into the first heat exchanger 2 to exchange heat with the outdoor air flow. After two times of cooling, the refrigerant has a lower temperature after being throttled by the first flow regulator 3, so that the second heat exchanger 101 can absorb more heat, achieve a better cooling effect, and improve the cooling capacity of the thermal management system. In the coolant circuit, the coolant flowing through the second heat exchange portion 92 needs to pass through the third heat exchanger 14 to dissipate heat, and then flow through the second channel of the compressor 1. Therefore, it is ensured that the coolant can effectively cool down the compressor 1. The fourth heat exchanger 9 can be a plate heat exchanger or other water-cooled heat exchangers; and the third heat exchanger 14 can be an air-cooled heat exchanger according to needs, which is not limited in this application.

In this embodiment, the fifth heat exchanger 6 includes a third heat exchange portion 61 and a fourth heat exchange portion 62. The flow channel of the third heat exchange portion 61 is used for circulating the refrigerant. The third heat exchange unit 61 is connected to the refrigerant circuit. The flow channel of the fourth heat exchange portion 62 is used for circulating the coolant. The fourth heat exchange portion 62 is connected to the coolant circuit. The third heat exchange portion 61 is not in communication with the fourth heat exchange portion 62. The third heat exchange portion 61 and the fourth heat exchange portion 62 can perform heat exchange.

The thermal management system in the first embodiment is a cooling-only air-conditioning system, and the refrigerant can only cool the compartment and cool the coolant. The present disclosure also provides other embodiments of the thermal management system, for example, a second embodiment, a third embodiment, a fourth embodiment, a fifth embodiment, the sixth embodiment and a seventh embodiment of the thermal management system. The refrigerant can be used to cool the compartment, heat the compartment, and heat the coolant. But the function of cooling the compartment and the function of heating the compartment can only be realized alternatively.

The present disclosure also provides the thermal management system in a second embodiment. Referring to FIG. 2 to FIG. 7, the structure of the thermal management system in the second embodiment is substantially the same as that of the first embodiment, the difference is that the thermal management system further includes a fluid switching device 4. The fluid switching device 4 can control an outlet of the first channel of the compressor 1 to communicate with the first heat exchanger 2 or communicate with the second heat exchanger 101. The flow direction of the refrigerant in the thermal management system can be switched by the fluid switching device 4.

The thermal management system also includes a first heating mode, which can heat the compartment. Specifically, under the first heating mode, the first flow channel of the compressor 1, the second heat exchanger 101, the first flow regulator 3, the first heat exchanger 2, and the first flow channel of the compressor 1 are sequentially communicated to form a refrigerant circuit. The high-temperature and high-pressure gaseous refrigerant firstly flows through the second heat exchanger 101, and the second heat exchanger 101 releases heat to increase the temperature of the air around the second heat exchanger 101. Under the action of the air flow, the hot air enters the grille air duct (not shown in the drawings) and is sent into the compartment so as to increase the temperature of the compartment and realize the heating function.

Specifically, the fluid switching device 4 has two working modes. In one working mode, referring to FIGS. 6 and 7, the thermal management system can perform a first cooling mode. The outlet of the first channel of the compressor 1 is in communication with one end of the first heat exchanger 2; the other end of the first heat exchanger 2 is in communication with one end of the first flow regulator 3; the other end of the first flow regulator 3 is in communication with one end of the second heat exchanger 101; and the other end of the second heat exchanger 101 is in communication with the inlet of the first channel of the compressor 1. The second heat exchanger 101 absorbs the heat of the air flow of the compartment. At this time, the thermal management system can cool the compartment. In the other working mode, referring to FIG. 3 to FIG. 5, the thermal management system can perform a first heating mode. The outlet of the first channel of the compressor 1 is in communication with one end of the second heat exchanger 101; the other end of the second heat exchanger 101 is in communication with one end of the first flow regulator 3; the other end of the first flow regulator 3 is in communication with one end of the first heat exchanger 2; and the other end of the first heat exchanger 2 is in communication with the inlet of the second channel of the compressor 1. The second heat exchanger 101 heats the air flow of the compartment. At this time, the thermal management system can heat the compartment. In this embodiment, the first flow regulator 3 has a bidirectional throttling function and a cut-off function. At the same time, the thermal management system can only perform one of the first heating mode and the first cooling mode.

In this embodiment, a branch where the second flow regulating device 5 and the fifth heat exchanger 6 are located is arranged in parallel with a branch where the first flow regulator 3 and the second heat exchanger 101 are located. Therefore, when the thermal management system performs the first heating mode, if the second flow regulating device 5 is turned on, the refrigerant in the fifth heat exchanger 6 will release heat to the coolant. If the fifth heat exchanger 6 is in communication with the second channel of the compressor 1 at this time, it is not beneficial to the cooling of the compressor 1. Therefore, the first valve 15 can be in the first working state, and the fifth heat exchanger 6 is not in communication with the second flow channel of the compressor 1. Alternatively, the second flow regulating device 5 is turned off, and no heat exchange occurs in the fifth heat exchanger 6.

In this embodiment, the second flow regulating device 5 may also have a bidirectional throttling function and a cut-off function. When the thermal management system performs the first heating mode, the first valve 15 is in the first working state. The second flow regulating device 5 is in the throttling state. The battery pack can be heated via the fifth heat exchanger 6. At the same time, the heat of the compressor 1 and the motor assembly can also be released via the third heat exchanger 14. While heating the compartment and the battery pack, cooling of the compressor 1 and the motor assembly is realized.

In some embodiments, under the first heating mode, the third heat exchanger 14 may communicate with at least one of the second flow channel of the compressor 1, the motor heat exchange assembly 14, and the battery heat exchange assembly 10. The third heat exchanger 14 can be arranged in parallel with the first heat exchanger 2, and the third heat exchanger 14 is arranged on a windward side of the first heat exchanger 2. The first heat exchanger 2 can absorb the heat of the third heat exchanger 14, thereby improving the heating effect of the thermal management system. Specifically, the environment air firstly flows through the third heat exchanger 14 to be heated. The heated air then flows through the first heat exchanger 2. The heat in the air is absorbed by the first heat exchanger 2. The heat in the coolant is recovered and utilized through the first heat exchanger 2, such as the waste heat of the compressor 1, the waste heat of the motor assembly, and the waste heat of the battery pack. Further, when the environment temperature is low, the first heat exchanger 2 may have the risk of frosting. Because the air flow flowing through the third heat exchanger 14 is heated, the heated air flow flows through the first heat exchanger 2, which can achieve the purpose of delaying the frosting of the first heat exchanger 2 or defrosting the first heat exchanger 2. It can be understood that when using the heat of the compressor 1 to defrost the first heat exchanger 2 is insufficient, the battery heat exchange assembly 10 and/or the motor heat exchange assembly 12 can be connected to the coolant circuit, and the waste heat in the thermal management system can be used to defrost the first heat exchanger 2 so as to achieve the purpose of energy saving, thereby improving the range of the vehicle.

In this embodiment, an auxiliary heat exchanger 102 and an auxiliary flow regulating device 103 may be connected in series in the branch where the first flow regulator 3 and the second heat exchanger 101 are located. The auxiliary flow regulating device 103 is connected between the second heat exchanger 101 and the auxiliary heat exchanger 102. The auxiliary flow regulating device 103 has a conduction function and a throttling function. When the thermal management system performs the first cooling mode, the auxiliary flow regulating device 103 is in a conduction state. Through the second heat exchanger 101 and the auxiliary heat exchanger 102, the air flow of the compartment is cooled at the same time, so as to achieve a better cooling effect. When the thermal management system performs the first heating mode, the auxiliary flow regulating device 103 may be in the conduction state. Through the second heat exchanger 101 and the auxiliary heat exchanger 102, the air flow in the compartment is heated simultaneously to achieve a better heating effect. Alternatively, the flow direction of the refrigerant in the thermal management system is the same as that in the first cooling mode, but the auxiliary flow regulating device 103 is in a throttling state. The air flow of the compartment is dehumidified by the second heat exchanger 101. The auxiliary heat exchanger 102 heats the dehumidified air flow to achieve the effect of heating and dehumidification.

The connection way the coolant system and the refrigerant circuit of the thermal management system in this embodiment is basically the same as that of the first embodiment, and reference may be made to the description of the first embodiment, which will not be repeated here.

Figure 8:
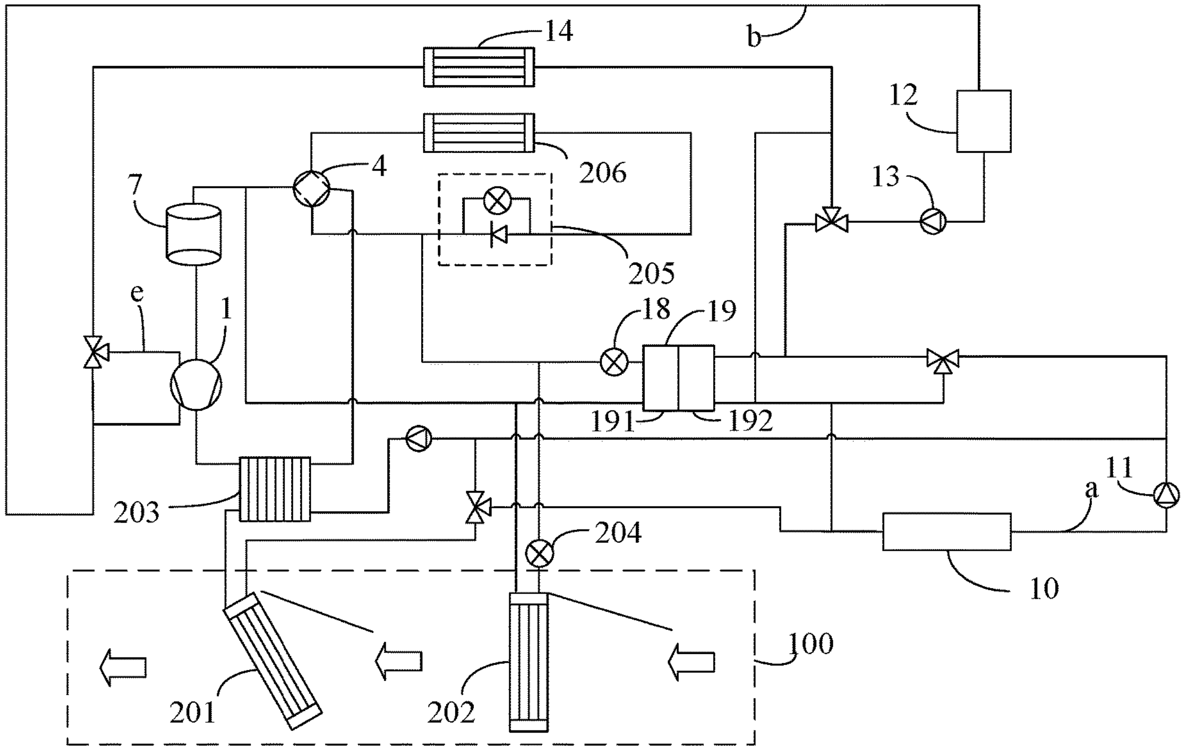
FIG. 8 is a schematic connection diagram of the thermal management system in a third embodiment of the present disclosure.

This application provides the thermal management system in a third embodiment. Referring to FIG. 8, the thermal management system of this embodiment includes a compressor 1, a first heat exchanger 206, a first flow regulator 204, a second heat exchanger 202, a third heat exchanger 14, a battery heat exchange assembly 10, a motor heat exchange assembly 12, a first pump 13 and a second pump 11. The difference between this embodiment and the first embodiment is that the thermal management system further includes a fluid switching device 4, a third flow regulating device 205, a fourth flow regulating device 18, a sixth heat exchanger 203, a seventh heat exchanger 19 and a heater core 201. In this embodiment, the outlet of the first channel of the compressor 1 is in communication with an inlet of the sixth heat exchanger 203. The fluid switching device 4 is used to switch whether an outlet of the sixth heat exchanger 203 is in communication with the first heat exchanger 206 or is in communication with the fourth flow regulating device 18, the third flow regulating device 205 or the first flow regulator 204.

In this embodiment, the heater core 201 and the second heat exchanger 202 are air-cooled heat exchangers, which can directly exchange heat with the air in the compartment. The sixth heat exchanger 203 and the seventh heat exchanger 19 are double-channel heat exchangers, which can be used for heat exchange between the refrigerant and the coolant. The seventh heat exchanger 19 includes a fifth heat exchange portion 191 and a sixth heat exchange portion 192 capable of exchanging heat with each other. The fifth heat exchange portion 191 is connected in the refrigerant circuit and can be used for circulating the refrigerant. The sixth heat exchange portion 192 is connected in the coolant circuit and can be used for circulating the coolant.

The thermal management system also includes a second heating mode. Under the second heating mode, the first flow channel of the compressor 1, the sixth heat exchanger 203, the third flow regulating device 205, the first heat exchanger 206, and the first flow channel of the compressor 1 are sequentially communicated to form a refrigerant circuit. The coolant channel of the sixth heat exchanger 203 is in communication with the heater core 201 to form a coolant circuit.

Referring to FIG. 8, the high-temperature and high-pressure refrigerant flowing out of the first channel of the compressor 1 flows into the sixth heat exchanger 203. In the sixth heat exchanger 203, the refrigerant transfers heat to the coolant. The coolant after absorbing heat in the sixth heat exchanger 203 flows to the heater core 201. The heater core 201 exchanges heat with the air flow in the compartment. The heater core 201 heats up the surrounding air. The heated air flow is blown into the compartment to heat the compartment. The refrigerant flowing out of the sixth heat exchanger 203 is throttled by the third flow regulating device 205, and enters the first heat exchanger 206 to exchange heat with the outdoor air flow. The refrigerant absorbs the heat of the environment air and flows back to the inlet of the first channel of the compressor 1, and circulates in this way. Under the second heating mode, the third heat exchanger 14 may communicate with at least one of the first flow channel of the compressor 1, the motor heat exchange assembly 14, and the battery heat exchange assembly 10. The cooling function is realized by the third heat exchanger 14. At the first heat exchanger 206, the first heat exchanger 206 can absorb the heat of the third heat exchanger 14, or use the third heat exchanger 14 to delay the frosting of the first heat exchanger 206, or use the third heat exchanger 2 to defrost the first heat exchanger 206 and recycle the waste heat of the coolant circuit, thereby making full use of the waste heat in the thermal management system to save energy and improve vehicle range.

In this embodiment, the third flow regulating device 205 is arranged adjacent to the first heat exchanger 206; the first flow regulator 204 is arranged adjacent to the second heat exchanger 202; and the fourth flow regulating device 18 is arranged adjacent to the seventh heat exchanger 19. The branch where the third flow regulating device 205 and the first heat exchanger 206 are located, the branch where the first flow regulator 204 and the first heat exchanger 202 are located, and the branch where the fourth flow regulating device 18 and the seventh heat exchanger 19 are located are arranged in parallel.

The thermal management system also includes a third cooling mode. Under the third cooling mode, the first flow channel of the compressor 1, the first heat exchanger 206, the fourth flow regulating device 18, the fifth heat exchange portion 191, and the first flow channel of the compressor 1 are sequentially communicated to form a refrigerant circuit. The first pump 13, the sixth heat exchange portion 192, the second flow channel of the compressor 1, and the first pump 13 are in communication to form a coolant circuit. In the seventh heat exchanger 19, the refrigerant absorbs the heat of the coolant to lower the temperature of the coolant and realize the cooling function of the compressor 1. It is also possible to connect the motor heat exchange assembly 12 and the battery heat exchange assembly 10 into the coolant circuit to realize cooling of the battery pack and the motor assembly. It can be understood that the thermal management system can only implement one of the second heating mode and the third cooling mode at the same time.

The thermal management system also includes a waste heat recovery mode. Under the waste heat recovery mode, the first flow channel of the compressor 1, the sixth heat exchanger 203, the fourth flow regulating device 18, the fifth heat exchange portion 191, and the first flow channel of the compressor 1 are sequentially communicated to form a refrigerant circuit. Wherein, the sixth heat exchanger 203 functions as a condenser; the fifth heat exchange portion 191 functions as an evaporator; the heating of the compartment is realized via the sixth heat exchanger 203; and the waste heat recovery of the coolant circuit is realized via the seventh heat exchanger 19.

The thermal management system also includes a first heating and dehumidification mode. Under the first heating and dehumidification mode, the first channel of the compressor 1, the sixth heat exchanger 203, the first flow regulator 204, the second heat exchanger 202, and the first channel of the compressor 1 are sequentially communicated to form a refrigerant circuit. Wherein, the sixth heat exchanger 203 functions as a condenser; the second heat exchanger 202 functions as an evaporator; the second heat exchanger 202 and the heater core 201 directly exchange heat with the air flow of the compartment; and the second heat exchanger 202 is disposed on a windward side of the heater core 201. The air with higher moisture content in the compartment firstly flows through the second heat exchanger 202 with lower temperature. The moisture in the air condenses into water when it is cooled. The dehumidified air flows through the heater core 201 to be heated. The heated air flow is blown into the compartment, thereby realizing the heating and dehumidification function. The thermal management system can perform at least one of the second heating mode, the first heating and dehumidification mode, and the waste heat recovery mode at the same time.

When the thermal management system implements the second heating mode and the waste heat recovery mode at the same time, it can recover the heat of the environment air and/or the coolant circuit while realizing the heating of the compartment, so as to realize the function of waste heat recovery. The heat in the environment is fully utilized, and heat is absorbed from the first heat exchanger 206 and the seventh heat exchanger 19 at the same time, so that the sixth heat exchanger 203 releases heat more fully. Therefore, the thermal management system has a better heating effect and can also achieve the purpose of energy saving.

When the thermal management system performs the second heating mode and the first heating and dehumidification mode simultaneously, it absorbs heat from the first heat exchanger 206 and the second heat exchanger 202 at the same time. By making reasonable use of the environment air temperature, the sixth heat exchanger 203 can ensure a stable heating effect, so that the thermal management system has a better heating and dehumidification effect.

When the thermal management system performs the waste heat recovery mode and the first heating and dehumidification mode at the same time, it absorbs heat from the seventh heat exchanger 19 and the second heat exchanger 202 at the same time, and recycles the heat of the coolant circuit. It can not only ensure the stable heating effect of the sixth heat exchanger 203, so that the thermal management system has better heating and dehumidification effect, but also can achieve the purpose of energy saving.

Of course, the thermal management system can also perform the second heating mode, the first heating and dehumidification mode and the waste heat recovery mode at the same time. It can not only realize the function of heating and dehumidification, but also realize the heat recovery of the coolant circuit, and can also make reasonable use of the heat of free environment air. It can not only ensure the stable heating effect of the sixth heat exchanger 203, but also achieve the purpose of energy saving.

In the coolant circuit of this embodiment, the fourth flow path d is not provided. One end of the second flow path b is in communication with the seventh heat exchanger 19 or is in communication with the third heat exchanger 14 through a valve element. The other end of the second flow path b is in communication with the fifth flow path e or the other end of the third heat exchanger 14. Whether the fifth flow path e is connected to a flow path formed in series by the second flow path b and the third heat exchanger 14 is selected through a valve element. The first flow path a and the flow path formed in series by the second flow path b and the third heat exchanger 14 are arranged in parallel. The above-mentioned valve element can be selected as a three-way valve or a three-way proportional valve, which is not limited in this application.

The connection structure of some components of the thermal management system of this embodiment and the operation mode of the first cooling mode are similar to those of the first embodiment, and reference may be made to the description of the first embodiment, which will not be repeated here.

Figure 9:
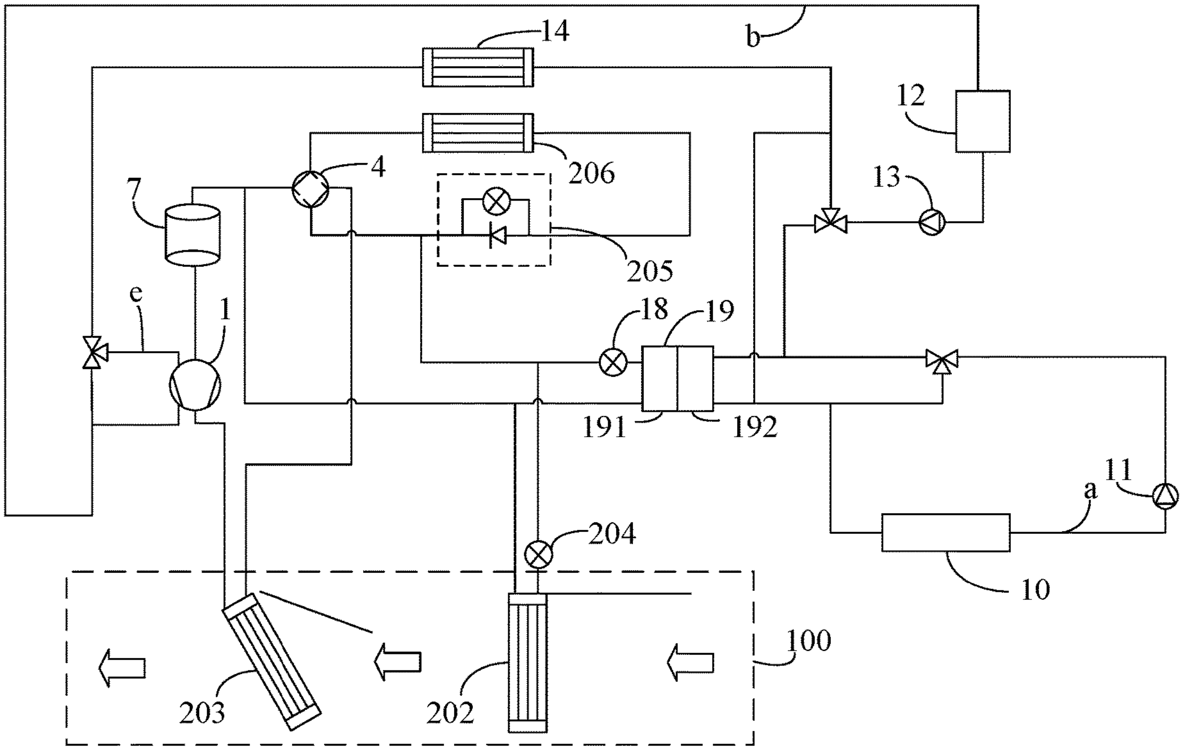
FIG. 9 is a schematic connection diagram of the thermal management system in a fourth embodiment of the present disclosure.

The present disclosure also provides the thermal management system in a fourth embodiment. Referring to FIG. 9, this embodiment is basically the same as the third embodiment, the difference is that the sixth heat exchanger 203 is an air-cooled heat exchanger, and the sixth heat exchanger

203 directly exchanges heat with the air flow of the compartment. For example, when the thermal management system performs the second heating mode, the sixth heat exchanger 203 directly exchanges heat with the air flow of the compartment. The air around the sixth heat exchanger 203 is heated. The heated air flow is blown into the compartment to heat the compartment. The connection structure between the components of the thermal management system of this embodiment and the operation mode of each mode are basically the same as those of the third embodiment, and reference may be made to the description of the third embodiment, which will not be repeated here.

The present disclosure also provides a thermal management system in a fifth embodiment. Referring to FIG. 10, this embodiment is basically the same as the third embodiment, the difference is that there are three parallel branches in the coolant circuit. The second flow channel of the compressor 1 is provided in a first branch. The motor heat exchange assembly 12 and the third heat exchanger 14 are provided in a second branch. The battery heat exchange assembly 10 is provided in a third branch. Each of the three branches can be connected in series with the sixth heat exchange portion 192 of the seventh heat exchanger 19 to form a circuit. The seventh heat exchanger 19 can exchange heat with components in each branch separately, or the seventh heat exchanger 19 can exchange heat with at least two components in two branches at the same time, so that the coolant circuit has more heat exchange methods. The connection structure between the components of the thermal management system of this embodiment and the operation mode of each mode are basically the same as those of the third embodiment, and reference may be made to the description of the third embodiment, which will not be repeated here.

Figure 11:
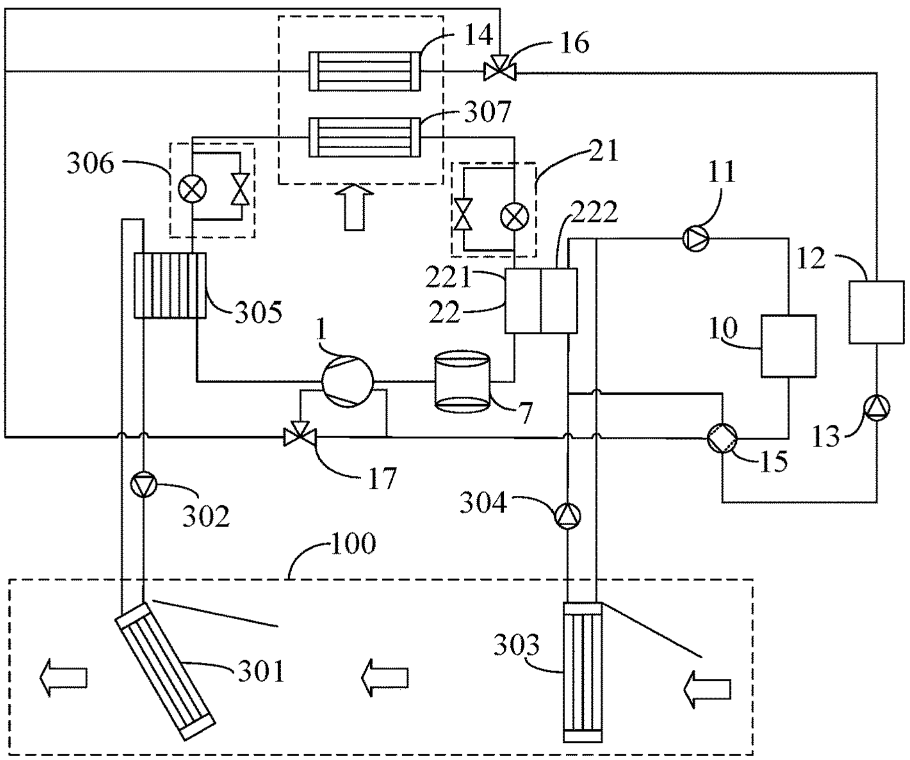
FIG. 11 is a schematic connection diagram of the thermal management system in a sixth embodiment of the present disclosure.

The present disclosure also provides the thermal management system in a sixth embodiment. Referring to FIG. 11, the thermal management system in this embodiment includes the compressor 1, the first heat exchanger 307, the first flow regulator 22, the second heat exchanger 22, the third heat exchanger 14, the battery heat exchange assembly 10, the motor heat exchange assembly 12, the first pump 13, the second pump 11 and the first valve 15. The difference between this embodiment and the first embodiment is that the thermal management system further includes a fifth flow regulating device 306, an eighth heat exchanger 303, a ninth heat exchanger 305, and a tenth heat exchanger 301. In the refrigerant circuit, the first flow channel of the compressor 1, the ninth heat exchanger 305, the fifth flow regulating device 306, the first heat exchanger 307, the first flow regulator 21, and the second heat exchanger 22 are sequentially communicated. The fifth flow regulating device 306 and the first flow regulator 21 have a conduction function and a throttling function. When the fifth flow regulating device 306 is turned on and the first flow regulator 21 is throttling, the ninth heat exchanger 305 and the first heat exchanger 307 function as condensers, and the second heat exchanger 22 functions as an evaporator. When the fifth flow regulating device 306 throttles, the ninth heat exchanger 305 functions as a condenser, and the second heat exchanger 22 and the first heat exchanger 307 function as evaporators.

In this embodiment, both the ninth heat exchanger 305 and the second heat exchanger 22 are double-channel heat exchangers. The second heat exchanger 22 includes a seventh heat exchange portion 221 and an eighth heat exchange portion 222 capable of exchanging heat with each other. The seventh heat exchange portion 221 is connected in the refrigerant circuit and can be used for circulating the refrigerant. The eighth heat exchanging portion 222 is connected in the coolant circuit for circulating the coolant. Both the eighth heat exchanger 303 and the tenth heat exchanger 301 are air-cooled heat exchangers, which can directly exchange heat with the air in the compartment. The eighth heat exchanger 303 may communicate with the eighth heat exchange portion 222 to form a coolant circuit. The tenth heat exchanger 301 may communicate with the coolant channel of the ninth heat exchanger 305 to form a coolant circuit.

Under the first cooling mode, the first flow channel of the compressor 1, the ninth heat exchanger 305, the fifth flow regulating device 306, the first heat exchanger 307, the first flow regulator 21, the second heat exchanger 22, and the first flow channels of the compressor 1 are sequentially communicated to form a circuit. The first flow regulator 21 is in a throttling state. The fifth flow regulating device 306 is in a conduction state. The second heat exchanger 22 is in communication with the eighth heat exchanger 303 to form a circuit. The circuit formed by the communication between the second heat exchanger 22 and the eighth heat exchanger 303 is a coolant circuit. Specifically, the high-temperature and high-pressure refrigerant flowing out of the first channel of the compressor 1 flows through the ninth heat exchanger 305 and the fifth flow regulating device 306, but does not exchange heat in the ninth heat exchanger 305. The refrigerant then flows into the first heat exchanger 307 and exchanges heat with environment air in the first heat exchanger 307, and the temperature of the refrigerant decreases. After being throttled by the first flow regulator 21, the refrigerant flows into the seventh heat exchange portion 221. The refrigerant absorbs the heat of the coolant in the second heat exchanger 22. The cooled coolant enters the eighth heat exchanger 303. The eighth heat exchanger 303 exchanges heat with the air flow in the compartment, and the low-temperature air flow is blown into the compartment to achieve the purpose of cooling the compartment. The coolant that absorbs the heat of the air in the compartment flows back into the eighth heat exchange portion 222 to exchange heat again, and circulates in this way. The refrigerant flows into the inlet of the first flow channel of the compressor 1, and circulates in this way.

In this embodiment, the thermal management system includes a fourth cooling mode. Under the fourth cooling mode, the first channel of the compressor 1, the ninth heat exchanger 305, the fifth flow regulating device 306, the first heat exchanger 307, the first flow regulator 21, the second heat exchanger 22, and the first flow channels of the compressor 1 are sequentially communicated to form a refrigerant circuit. At least one of the first flow regulator 21 and the fifth flow regulating device 306 is in a throttling state. The first pump 13, the second channel of the compressor 1 and the eighth heat exchanging portion 222 are in communication to form a coolant circuit. It can be understood that, according to the state of the thermal management system, the refrigerant circuit can also have other connection modes, and the specific connection mode can refer to the first embodiment.

The thermal management system can perform the first cooling mode and the fourth cooling mode simultaneously, and realize the waste heat recovery of the coolant circuit while realizing the cooling of the compartment. Using one heat exchanger (that is, the second heat exchanger 22) to simultaneously absorb the heat of the compartment and the coolant circuit makes the structure of the thermal management system simple and can also reduce costs.

In this embodiment, the thermal management system further includes a third heating mode. Under the third heating mode, the first flow channel of the compressor 1, the ninth heat exchanger 305, the fifth flow regulating device 306, the first heat exchanger 307, the first flow regulator 21, the second heat exchanger 22, and the first flow channel of the compressor 1 are sequentially communicated to form a refrigerant circuit. At least one of the first flow regulator 21 and the fifth flow regulating device 306 is in a throttling state. The tenth heat exchanger 301 is in communication with the coolant channel of the ninth heat exchanger 305 to form a circuit. The refrigerant may exchange heat with the coolant in the ninth heat exchanger 305. At this time, the eighth heat exchanger 303 does not exchange heat with the air flow of the compartment.

Specifically, under the third heating mode, in the ninth heat exchanger 305, the refrigerant transfers heat to the coolant. The heated coolant flows into the tenth heat exchanger 301. The tenth heat exchanger 301 heats up the air flow in the compartment. The heated air is blown into the compartment to realize the function of heating the compartment. The cooled coolant flows back into the ninth heat exchanger 305 to be heated again, and circulates in this way. Under the third heating mode, the fifth flow regulating device 306 may be in a throttling state; the first flow regulator 21 is in a conduction state; the ninth heat exchanger 305 functions as a condenser; and the first heat exchanger 307 and the second heat exchanger 22 function as evaporators. Alternatively, the fifth flow regulating device 306 is in a conduction state; the first flow regulator 21 is in a throttling state; the ninth heat exchanger 305 and the first heat exchanger 307 function as condensers; and the second heat exchanger 22 functions as an evaporator and can be used to delay or defrost the first heat exchanger 307 from frosting. Under the third heating mode, the third heat exchanger 14 may communicate with at least one of the first flow channel of the compressor 1, the motor heat exchange assembly 14, and the battery heat exchange assembly 10. The first heat exchanger 307 can absorb heat from the third heat exchanger 14. The purpose of energy saving can be achieved by recovering the heat of the coolant circuit through the first heat exchanger 307, or delaying the frosting of the first heat exchanger 307 through the third heat exchanger 14, or defrosting the first heat exchanger 307 through the third heat exchanger 14.

In this embodiment, the thermal management system further includes a second heating and dehumidification mode. Under the second heating and dehumidification mode, the air dehumidified by the eighth heat exchanger 303 is heated by the tenth heat exchanger 301 and then blown into the compartment to realize the heating and dehumidification function. The thermal management system can simultaneously perform at least one of the second heating and dehumidification mode, the third heating mode, and the first cooling mode.

In this embodiment, the thermal management system further includes a third pump 302 and a fourth pump 304. The third pump 302 is used to provide power to the coolant circuit formed by the communication between the tenth heat exchanger 301 and the ninth heat exchanger 305. The fourth pump 304 is used to provide power to the coolant circuit formed by the communication between the second heat exchanger 22 and the eighth heat exchanger 303. The third pump 302 and the fourth pump 304 can choose electronic water pumps. The connection structure of some components of the thermal management system of this embodiment and the operation mode of the first cooling mode are similar to those of the first embodiment, and reference may be made to the description of the first embodiment, which will not be repeated here.

Figure 12:
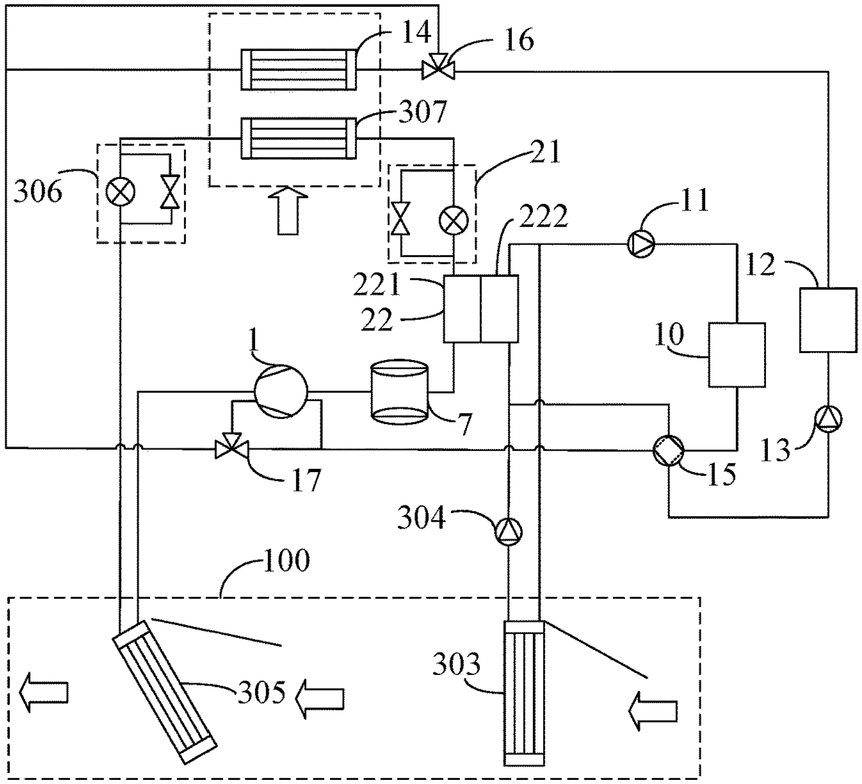
FIG. 12 is a schematic connection diagram of the thermal management system in a seventh embodiment of the present disclosure.

The present disclosure also provides the thermal management system in a seventh embodiment. Referring to FIG. 12, this embodiment is basically the same as the sixth embodiment. The difference is that the ninth heat exchanger 305 is an air-cooled heat exchanger. The ninth heat exchanger 305 directly exchanges heat with the air in the compartment. A damper is provided on an air inlet side of the ninth heat exchanger 305. When the thermal management system performs the fourth cooling mode, the damper is closed, or the third pump 302 is not turned on, and the ninth heat exchanger 305 does not perform heat exchange. The connection structure between the components of the thermal management system of this embodiment and the operation mode of each mode are basically the same as those of the sixth embodiment, and reference can be made to the description of the sixth embodiment, which will not be repeated here.

The thermal management system of the present disclosure includes an air conditioning cabin 100. In all the above-mentioned embodiments, the heat exchangers capable of directly exchanging heat with the air flow of the compartment are located in the air conditioning cabin 100. The air conditioning cabin 100 has an internal circulation state and an external circulation state. When in the internal circulation state, an inlet of the air-conditioning cabin 100 is in communication with the compartment; an outlet of the air conditioning cabin 100 is in communication with the compartment; and the air in the compartment is blown into the compartment after being heat-exchanged in the air conditioning cabin 100. In the external circulation state, the inlet of the air conditioning cabin 100 is in communication with the atmospheric environment; the outlet of the air conditioning cabin 100 is in communication with the compartment; and the air in the atmospheric environment is blown into the compartment after being heat-exchanged in the air conditioning cabin 100.

The "connection" between two components in this application can be a direct connection or a connection through a pipeline where only the pipeline can be provided between the two components, or a valve or other components can also be provided between the two components. Similarly, the "communication" between two components in this application can be a direct communication or a communication through a pipeline where only the pipeline can be provided between the two components, or a valve or other components can also be provided between the two components and then communicate with each other.

The present disclosure also provides a control method of the thermal management system. The control method in this application is applicable to the thermal management system of all the above embodiments. The thermal management system also includes a control system which can be used to control the working state of the thermal management system.

Referring to FIG. 1, the control system includes a controller 200 and a plurality of sensors (not shown in the drawings). The controller 200 is electrically connected with the sensors. The controller 200 can be used to obtain the working information obtained by the sensors. The sensors can be used to obtain working information of the motor assembly, the battery pack and heat exchanging devices. The heat exchanging devices are the motor heat exchanging assembly 12, the battery heat exchanging assembly 10 and multiple heat exchangers in all the above embodiments. Optionally, the working information includes at least one of temperature, humidity and pressure. Optionally, the sensors can also process the obtained working information.

The controller 200 is electrically connected to some components of the thermal management system, for example, the compressor 1, the air conditioning cabin 100, a blower, a valve device, a pump device, and a sensor. The controller 200 can be used to obtain the working information obtained by the sensor, and can be used to adjust the working states of the compressor 1, the air conditioning cabin 100, the blower, the valve device and the pump device. The adjustment of the working state includes at least one of opening the component, closing the component, adjusting the rotational speed of the component, adjusting the opening degree of the component, and adjusting the power of the component. The valve device is a component used to switch the direction of fluid flow and a component used to regulate the flow of fluid in the thermal management system, for example, the first valve 15, the fluid switching device 4, the first flow regulator 3, the second flow regulating device 5, the third flow regulating device 205, the fourth flow regulating device 18, the fifth flow regulating device 306, and the like. The pump device is a component used to provide power for the flow of cooling fluid in the thermal management system, for example, the first pump 11, the second pump 13, the third pump 302, the fourth pump 304, and the like.

The controller 200 can be used to implement the control method of the thermal management system.

The control method of the thermal management system includes: obtaining passenger demands and working information obtained by the sensor; and according to the passage demands and the working information obtained by the sensor, the controller 200 adjusting the working states of the components in the thermal management system, so that the thermal management system performs an appropriate air-conditioning operation mode, thereby enabling thermal management of the passenger compartment, the motor assembly and the battery pack.

The thermal management system also includes an interaction device. The controller 200 is electrically connected with the interaction device. The controller 200 can obtain the passenger demands through the interaction device, such as a target temperature required by a passenger or an operating mode of the air conditioner required by the passenger. Optionally, the interaction device may be a control panel of an electric vehicle. The operation mode of the air conditioner includes one or a combination of at least two of the coolant mode, the first cooling mode, the second cooling mode, the third cooling mode, the fourth cooling mode, the first heating mode, the second heating mode, the third heating mode, the waste heat recovery mode, the first heating and dehumidification mode, and the second heating and dehumidification mode. The connection status of the thermal management system under each mode can refer to the previous description, and will not be repeated here.

The above descriptions are only preferred embodiments of the present disclosure, and do not limit the present disclosure in any form. Although the present disclosure has disclosed the above with preferred embodiments, it is not intended to limit the present disclosure. Those of ordinary skill in the art, without departing from the scope of the technical solutions of the present disclosure, may use the technical content disclosed above to make some changes or modify them into equivalent embodiments with equivalent changes. However, any simple modifications, equivalent changes and modifications made to the above embodiments according to the technical essence of the present disclosure are still within the scope of the technical solutions of the present disclosure.

What is claimed is:

1. A thermal management system, comprising: a compressor, a first heat exchanger, a first flow regulator, a second heat exchanger, a third heat exchanger and a first pump; the compressor comprising a first flow channel to circulate a refrigerant and a second flow channel to circulate a coolant; the first flow channel of the compressor is not in communication with the second flow channel of the compressor;

the second flow channel of the compressor being capable of communicating with the third heat exchanger; the first flow channel of the compressor being capable of communicating with the first heat exchanger; the first heat exchanger being capable of communicating with the first flow regulator; the first flow regulator being capable of communicating with the second heat exchanger; the second heat exchanger being capable of communicating with the first flow channel of the compressor;

wherein the thermal management system has a coolant mode and a first cooling mode;

in the coolant mode, an outlet of the first pump, an inlet of the third heat exchanger, an outlet of the third heat exchanger, an inlet of the second flow channel of the compressor, an outlet of the second flow channel of the compressor, and an inlet of the first pump are in communication in sequence to form a coolant circuit; and the third heat exchanger performs heat exchange with an atmospheric environment to dissipate heat of the coolant into the atmospheric environment, so that the compressor is cooled down by the coolant when flowing through the second flow channel of the compressor in the coolant mode;

in the first cooling mode, an outlet of the first flow channel of the compressor, an inlet of the first heat exchanger, an outlet of the first heat exchanger, an inlet of the first flow regulator, an outlet of the first flow regulator, an inlet of the second heat exchanger, an outlet of the second heat exchanger, and an inlet of the first flow channel of the compressor are in communication in sequence to form a refrigerant circuit; and the first flow regulator is in a throttling state; the second heat exchanger being configured to be disposed in an air conditioning cabin; air flowing through the second heat exchanger being lower in temperature, and a compartment being cooled down in the first cooling mode by flowing the air into the compartment;

wherein the thermal management system is capable of performing the coolant mode and the first cooling mode simultaneously, the third heat exchanger in the coolant circuit and the second heat exchanger in the refrigerant circuit are separated by a distance from each other.

2. The thermal management system according to claim 1, further comprising a device to be cooled, the device to be cooled comprising at least one of a motor heat exchange assembly and a battery heat exchange assembly;

wherein in the coolant mode, the first pump, the device to be cooled, the second channel of the compressor and the third heat exchanger are in communication to form the coolant circuit; and the second channel of the compressor is arranged in series with the device to be cooled.

3. The thermal management system according to claim 1, further comprising a device to be cooled, the device to be cooled comprising at least one of a motor heat exchange assembly and a battery heat exchange assembly;

wherein in the coolant mode, the second flow channel of the compressor and the third heat exchanger are in communication to form the coolant circuit; the device to be cooled and the third heat exchanger are in communication to form the coolant circuit; and a branch where the second flow channel of the compressor is located is arranged in parallel with a branch where the device to be cooled is located.

4. The thermal management system according to claim 1, further comprising a fourth heat exchanger, the fourth heat exchanger comprising a first heat exchange portion and a second heat exchange portion, the first heat exchange portion and the second heat exchange portion not being in communication, the first heat exchange portion being connected between the compressor and the first heat exchanger;

wherein in the first cooling mode, the first flow channel of the compressor, the first heat exchange portion, the first heat exchanger, the first flow regulator and the second heat exchanger are in communication to form the refrigerant circuit; wherein an outlet of the first flow channel of the compressor is in communication with an inlet of the first heat exchange portion; an outlet of the first heat exchange portion is in communication with an inlet of the first heat exchanger, an outlet of the first heat exchanger is in communication with an inlet of the first flow regulator, and the outlet of the first flow regulator is in communication with the inlet of the second heat exchanger; the first pump, the second heat exchange portion, the third heat exchanger and the second flow channel of the compressor are in communication to form the coolant circuit; and the refrigerant in the first heat exchange portion exchanges heat with the coolant in the second heat exchange portion.

5. The thermal management system according to claim 1, further comprising a second flow regulator and a fifth heat exchanger; the fifth heat exchanger comprising a third heat exchange portion and a fourth heat exchange portion; the third heat exchange portion and the fourth heat exchange portion not being in communication; an outlet of the second flow regulator being capable of communicating with an inlet of the third heat exchange portion;

wherein the thermal management system has a second cooling mode; in the second cooling mode, the first flow channel of the compressor, the first heat exchanger, the second flow regulator and the third heat exchange portion are in communication to form the refrigerant circuit; the outlet of the second flow regulator is in communication with the inlet of the third heat exchange portion; the second flow regulator is in a throttling state; the second flow channel of the compressor, the first pump and the fourth heat exchange portion are in communication to form the coolant circuit; and the refrigerant in the third heat exchange portion exchanges heat with the coolant in the fourth heat exchange portion; and wherein the thermal management system is capable of performing the first cooling mode and the second cooling mode simultaneously.

6. The thermal management system according to claim 1, wherein the thermal management system has a first heating mode;

wherein in the first heating mode, an outlet of the first flow channel of the compressor is in communication with the inlet of the second heat exchanger, an outlet of the second heat exchanger is in communication with an inlet of the first flow regulator, the outlet of the first flow regulator is in communication with an inlet of the first heat exchanger, and an outlet of the first heat exchanger is in communication with an inlet of the first flow channel of the compressor; the first flow regulator is in a throttling state;

wherein the thermal management system is capable of performing the coolant mode and the first heating mode simultaneously.

* * * * *